United States Patent [19]

McGovern et al.

[11] Patent Number: 4,511,247
[45] Date of Patent: Apr. 16, 1985

[54] SURVEYING TECHNIQUE WITH CORRECTION OF OPTICAL ERRORS CAUSED BY ATMOSPHERIC TURBULENCE

[76] Inventors: Paul A. McGovern, 440 Second St., Dunellen, N.J. 08812; Mauro Zambuto, 445 W. 23 St., New York, N.Y. 10011

[21] Appl. No.: 413,478

[22] Filed: Aug. 31, 1982

[51] Int. Cl.³ .............................................. G01C 5/04
[52] U.S. Cl. .............................. 356/3; 350/3.6; 350/320
[58] Field of Search ................ 350/3.6, 320, 321; 356/1, 2, 3

[56] References Cited

U.S. PATENT DOCUMENTS

| | | |
|---|---|---|
| 1,713,498 | 5/1929 | Cooke . |
| 2,911,879 | 11/1959 | Giwosky . |
| 2,947,213 | 8/1960 | Oddie . |
| 3,234,845 | 2/1966 | Stavis . |
| 3,237,511 | 3/1966 | Helava . |
| 3,621,582 | 11/1971 | Radencic . |
| 3,762,818 | 10/1973 | Johnson et al. . |
| 3,982,837 | 9/1976 | Cummins . |
| 4,124,299 | 11/1978 | Heystek . |

OTHER PUBLICATIONS

Paul A. McGovern, Statistical Averaging in Position Determination by Holography under Turbulence Conditions, Dissertation, New Jersey Institute of Technology, 1981.

*Primary Examiner*—Bruce Y. Arnold
*Attorney, Agent, or Firm*—Lee C. Robinson, Jr.

[57] ABSTRACT

A survey of an airport runway or other large structure includes statistical correction of error caused by atmospheric turbulence. Visible grid markers are placed, e.g., at twenty foot centers, in rows and columns on the runway. Absolute vertical reference points are established, favorably by using floats in tubes joined to a common trough pipe, for each row of the grid markers. A holographic reference grid is reconstructed, preferably at a safe distance from the runway, so that the reconstructed reference grid is disposed in the vertical plane of a particular row of grid markers. Then the locations of the grid markers, the absolute reference points, and the reference grid are recorded a plurality of times, for example, by multiple-exposing photographic film. The statistical mean locations of the images of the grid markers and absolute reference points are determined, relative to the reconstructed reference grid.

11 Claims, 10 Drawing Figures

FIG. 1

Q = OBSERVATION POINT
B,C,D = POINTS ON AN OBJECT UNDER OBSERVATION

FIG. 2

Q = OBSERVATION POINT
B,C,D = POINTS ON AN OBJECT UNDER OBSERVATION
$N_{()}$ = INDEX OF REFRACTION OF A LAYER OF MEDIUM

| | | 2 | 2 | 5 | 7 | 8 | 8 | 7 | 4 | | | 43 |
|---|---|---|---|---|---|---|---|---|---|---|---|---|
| | | 5 | 9 | 10 | 10 | 10 | 10 | 10 | 8 | 4 | | 76 |
| | 3 | 9 | 10 | 10 | 10 | 10 | 10 | 10 | 8 | 6 | 1 | 87 |
| | 2 | 6 | 10 | 10 | 10 | 10 | 10 | 10 | 10 | 7 | 4 | 89← |
| 1 | 2 | 6 | 9 | 10 | 10 | 10 | 10 | 10 | 8 | 5 | 2 | 83 |
| | 2 | 5 | 6 | 7 | 7 | 6 | 5 | 2 | 2 | | | 42 |

| | | 3 | 7 | 9 | 10 | 10 | 10 | 7 | | | 56 |
|---|---|---|---|---|---|---|---|---|---|---|---|
| | 3 | 5 | 10 | 10 | 10 | 10 | 10 | 8 | | | 66 |
| 1 | 5 | 9 | 10 | 10 | 10 | 10 | 10 | 8 | | | 73← |
| 3 | 8 | 8 | 10 | 10 | 10 | 10 | 10 | 8 | | | 77← |
| 3 | 5 | 6 | 8 | 9 | 9 | 8 | 2 | 1 | | | 51 |
| 2 | 3 | 3 | 3 | 3 | 3 | 1 | | | | | 18 |

9  24  34  48  51  52  49  42  32
               ↑

SURVEYING TECHNIQUE WITH CORRECTION OF OPTICAL ERRORS CAUSED BY ATMOSPHERIC TURBULENCE

BACKGROUND OF THE INVENTION

This invention relates to surveying of large structures, and is particularly related to a surveying technique that takes into account optical disturbances, such as those caused by atmospheric turbulence.

Atmospheric turbulence affects optical light paths and introduces a significant amount of error when viewing objects at a long distance in a survey. Standard surveying practices are severly hampered by atmospheric turbulence since the only conventional techniques available to deal with it are mostly qualitative and empirical, and offer solutions that are cumbersome, economically onerous, and impractical.

The methods utilized for modern surveying have attempted to keep the inevitable measurement errors within acceptable limits. The concepts of "accuracy" and "precision" must be understood if typical measurement errors are to be classified. Generally, "accuracy" is defined as "the degree of absolute nearness to the truth", while "precision" means "the degree of refinement in the performance of an operation." There are three types of error which act independently to disturb the accuracy and precision of a survey measurement: Namely, atmospheric conditions, instrument error, and human error.

Typical instrument errors are caused, for example, in tape measures and rods whose lengths are grossly dependent on temperature, and in transits in which the relative location or orientation of the lenses, scales, and levels thereof are subject to temperature variations, manufacturing tolerances, and the physical history of the particular transit. Human errors can be expected, for example, due to the change in focal length of a surveyor's eyes during a survey, or due to fatigue as the work progresses.

In order to carry out a survey in which instrumentation and human errors are brought to within standard tolerances, a combination of geometric measurements, counter measurements, and remeasurements are carried out until the required accuracies are obtained.

Unfortunately, no previous surveying technique has adequately dealt with the problem of inaccuracies resulting from atmospheric disturbances.

One example of an application in which the complexities of surveying techniques have serious impact is in airport runway testing and maintenance. Not only must the runway be set out accurately when it is first installed, but there is a need for recurrent surveys arising from uneven settling of the runways and from support bed deterioration.

The gravity of runway deterioration is determined by the impact of runway unevenness on aircraft. While very short wavelength grade variations (i.e., bumps) constitute the most easily observable deviations from a flat runway, aircraft suspension systems effectively smooth out such variations, and these small grade variations are generally not critical. However, medium wavelength, gradual changes in grade are not absorbed by suspension systems, but rather tend to cause changes in the attitude of the aircraft. This results in changes in the windload forces on the aircraft wing, and if these changes are not anticipated and corrected by the pilot, they can result in serious or disastrous consequences.

To make matters worse, these gradual grade variations have always been the most difficult to detect and remove. Furthermore, with the advent of large, tail-heavy planes, the requirement for runway flatness is further increased in that grade wavelengths in excess of 2,000 feet have become critical.

Prior to this invention, it has been very difficult to detect accurately such grade variations over the entire area of a typical runway of, for example, 10,000 foot length and 150 foot width. Typically, an attempt to survey such a runway would require using 20 foot centers, and attaining a first-cut accuracy of within 1/10 foot of vertical error per 1,000 feet measured. The execution of this type survey is painstaking and expensive. Utilizing four-man teams, as much as 500 man-days are required, and the runway must be shut down for the entire period.

However, for all this trouble, the resultant data is often of barely marginal quality. Atmospheric turbulence produces intolerable optical errors at viewing distances in excess of 400 feet on a still winter night, and at distances in excess of 50 feet on a hot summer day. Consequently, the number of transit sightings possible from a single reference transit location is severly limited, and large numbers of transit locations are necessary. The coordinates of each additional transit location can only be determined by dependent calculation, which generates error propagation and thereby renders it virtually impossible to obtain a true accuracy of "less than 1/10 foot error per 1,000 feet" as is required.

Still further, the closing of a runway at a busy airport has an intolerable impact on the operating capacity of the airport. Consequently, airport management is often reluctant to permit such a survey until the surface conditions deteriorate to the point where the hazards presented to aircraft are worse than the traffic congestion problems resulting from a runway shutdown. As a result of this, airport authorities and agencies have long sought an improved surveying technique which will permit accurate measurement of grade variations in the runway, but which will not severly affect runway take-off and landing operations.

Moreover, a surveying technique has also been sought which will provide an accurate means of spot-checking flatness conditions without interrupting runway operations. However, previous attempts to develop such technique have not been sufficiently successful. Such previously proposed techniques for example include equipping surface vehicles with altimeters, vibration detectors and recorders, and then driving such vehicles down the runways at different speeds. This technique has not provided the desired survey data with the necessary accuracy.

Furthermore, techniques for surveying large structures have been sought without success in allied fields, such as attempting to determine the deflections sustained by large bridges and buildings under severe windload conditions.

OBJECTS AND SUMMARY OF THE INVENTION

Accordingly, it is an object of this invention to provide a surveying technique suitable for surveying of large structures and which will provide an accurate measurement of flatness deviation notwithstanding the existence of atmospheric turbulence.

It is another object of this invention to provide such a surveying technique which can be carried out without severely hampering the operation of the structure which is being surveyed.

It is a further object of this invention to provide a surveying technique which can be carried out with a minimum of personnel and equipment, yet which will rapidly yield accurate results.

According to several favorable embodiments of this invention, an improved method of surveying a structure of large dimension is provided in which optical errors caused by atmospheric turbulence are statistically corrected. In such a method, visible grid markers are placed at properly predetermined location on the structure. Then, a holographic reference grid is reconstructed such that the reconstructed reference grid is superimposed on selected ones of the grid markers. The locations of images of the selected grid markers and of the reconstructed grid are recorded a plurality of times, that is, sufficient times so that statistical means of each of the locations can be determined. Then, the statistical means of the locations of each of the selected grid markers are determined relative to the reconstructed holographic grid.

In many embodiments, a pair of absolute reference points are established and arranged in a plane with aligned grid markers of one or more particular groups of the visible grid markers, and the statistical means of the locations of the images of the grid markers and of each of the absolute reference points are determined relative to each other. These absolute reference points can favorably be established by disposing a pair of vertical tubes at opposite ends of at least one of the groups of the grid markers, with each of the tubes containing a liquid, such as water, and a float in the liquid visible from an observation point. The tubes are interconnected with one another, so that the floats stay at the same level relative to sea level.

The optically reconstructed holographic reference grid is achieved by illuminating a holographic plate containing a hologram of a reference grid, and the size and position of the reconstructed grid is determined by adjusting the position of a reconstruction light source illuminating the holographic plate, and adjusting the wavelength of its light, so that the holographic reference grid is properly magnified and disposed in the plane or planes containing the group or groups of the grid markers and the associated absolute reference points.

Recording of the locations of the images of the grid markers, absolute reference points, and reconstructed holographic grids can be achieved photographically by multiple-exposing a sheet of photographic film. Then, the statistical means of the locations of these images can be determined based on the density of the multiple-exposed images on the film, using a weighted-average center of each of the images.

It is also possible to record the location of the images of the groups of grid markers, the absolute reference points, and the reconstructed holographic grid by real-time recordings of these location in a computer, employing optical digitizing equipment. The statistical means of the locations of the images of the grid markers, absolute reference points, and the reconstructed grid can be determined in real-time, simultaneous with the recording of such locations. In that way, the computer can determine automatically when a sufficient number of measurements have been taken to establish the statistical means of these locations.

Further information concerning the background of this invention and the principles thereof is also contained in the doctoral dissertation, Paul Aloysius McGovern, Statistical Averaging in Position Determination by Holography under Turbulence Conditions, New Jersey Institute of Technology, 1981, which was prepared by the inventors jointly, and which is incorporated in this specification by reference.

The above and further objects, features, and advantages of this invention can be more fully appreciated from the ensuing description of a preferred embodiment, when considered in connection with the accompanying drawings.

DETAILED DESCRIPTION OF A PREFERRED EMBODIMENT

By way of background for this invention, an explanation of the effects of atmospheric turbulence upon surveying will first be explained with reference to FIGS. 1 and 2.

Figure 1:
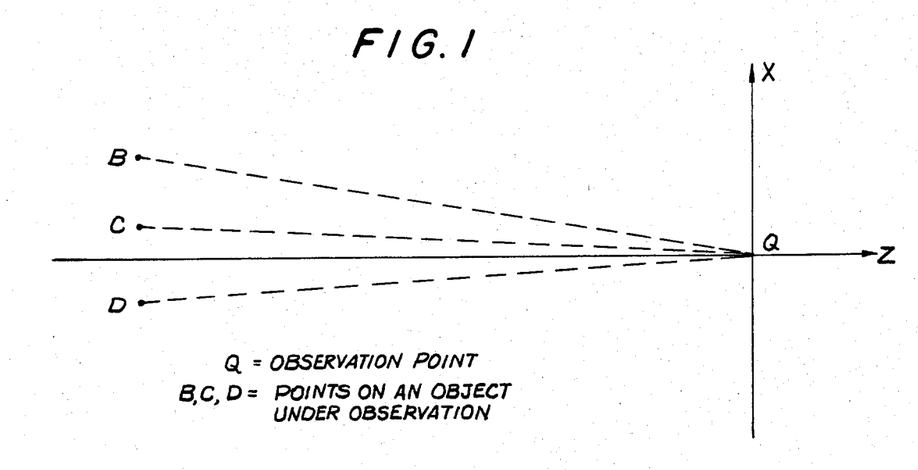
FIGS. 1 and 2 illustrate optical paths from objects under observation in the absence of atmospheric turbulence and through a turbulent medium, respectively.

To obtain an understanding of the nature and the extent of the uncertainty attributable to atmospheric turbulence, an observation in the absence of the turbulence will be considered with reference to FIG. 1. In that drawing, from an observation point Q, three randomly selected points B, C, and D on an object are observed. In the ideal case of FIG. 1 where the region between the observation point Q and the points B, C, and D on the object is homogenious and isotropic, there is a constant index of refraction N. Consequently, optical paths of light rays from the points B, C, and D to the observation point Q would be absolutely straight lines as shown. In nature, however, and more specifically in the earth's atmosphere, this homogeneous condition never exists for distances of more than a few feet.

Figure 2:
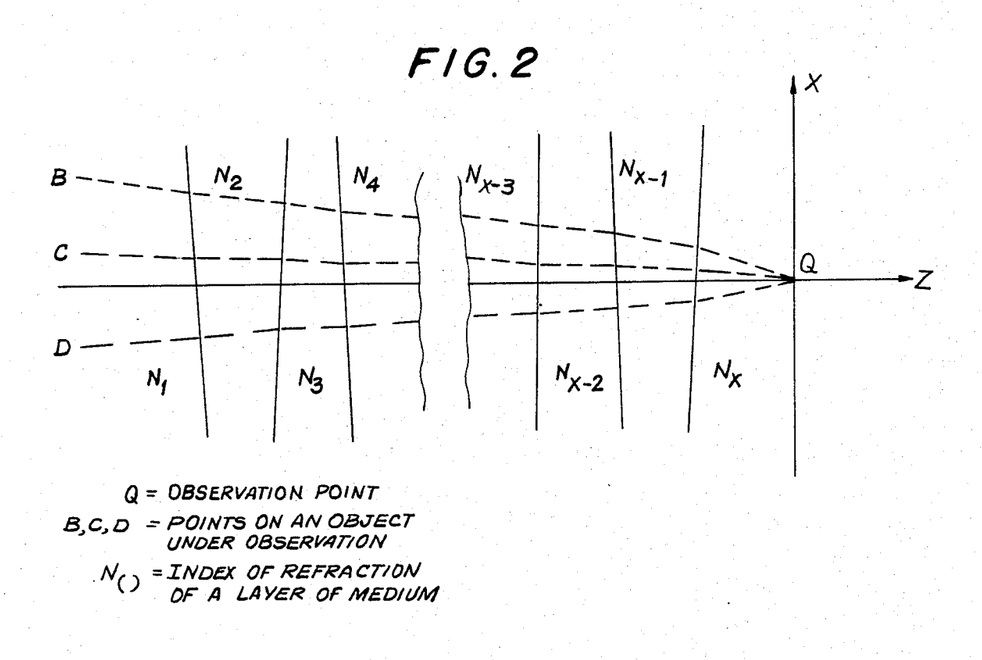

In reality, for a variety of reasons, including differential heating of various volumes of air, differences in relative humidity between the various volumes of air, and compression and rarefaction of air as a result of objects passing through it, the region between object and observer can be represented as a series of volumes of air with different indices of refraction $N_1, N_2, \ldots N_{x-1}$, and $N_x$, as illustrated in FIG. 2. The boundary layers between these volumes are not predictable, and the values of the various indices of refraction $N_1$ to $N_x$ are constantly changing and are randomly distributed. The light paths from the points B, C, and D will be bent at the interface between each of the volumes at which there is a change of refractive index. Consequently, because the light does not travel in a true straight line, the points B, C, and D will have apparent positions B', C', and D' as observed from the observation point Q. Moreover, because of the constantly changing nature of the air volumes between the point Q and the points B, C, and D, the apparent positions B', C', and D' will change from one observation to the next. From the point of view of an observer at the point Q, the observed object and the points B, C, and D will each appear to move randomly about a mean position.

In simple theory, at least, the mean or average relative locations of the points B', C', and D' can be calculated by taking a sufficiently large number of observations. However, it is impossible to place an accurate reference system directly in an imaging observation plane without obtaining uncorrectable error in the position of the reference system relative to the observed points B, C, and D.

The reason it is possible to obtain the relative positions of the image points B', C', and D' can be simply stated as follows. Consider an optical system imaging the points B, C, and D into image points B', C', and D' on a plane surface, e.g., a photographic plate. Establishing a coordinate system in the imaging plane, the positions of B', C', and D' can be represented by position vectors $R_{B'}$, $R_{C'}$ $R_{D'}$, respectively, the expected values of which will be slowly varying time dependent. The first increments of these position vectors are, however, statistically stationary. Therefore the difference vectors of the image points, i.e., $R_{C'}-R_{B'}$, $R_{D'}-R_{B'}$, etc., are time independent and the expected (mean) values of the difference vectors are equal to the expected (mean) values of the respective position vectors. Hence, the difference between the expected values of these position vectors is time independent, providing that statistical averaging operations are carried out over a sufficient statistically significant sample of observations. Thus, the relative location of each of the points B, C, and D can be known relative to each other, or, more preferably, can be known relative to a fixed absolute reference point.

If it is now assumed that the true and absolute location of some object is to be determined by observing the object across a field of view that contains atmospheric turbulence, such as surveying a runway that is presently being used for landings and takeoffs, the instantaneous translation and bending of the light beams resulting from atmospheric turbulence will cause the objects being surveyed to appear to be moving about in a random fashion. Because of the random nature of this motion, it is possible to take a sufficiently large number of observations over some interval of time, with each observation producing a set of coordinates. Then, by finding statistical means of these locations, the relative location of the observed coordinates, relative to some fixed point or points can be determined.

In order to provide an observation scale for observing both the object to be surveyed and the fixed, absolute reference points for a large number of observations, a holographic grid can be employed. This provides a scale with which to determine the relative locations of all the observed points. In order for the scale to be useful, it must itself be free of distortion and not subject to the above-described atmospheric turbulence, but must still be in the focal plane of the observed points. The holographic grid can be reconstructed by proper positioning of a reconstruction light source so as to appear in the plane of the observed points. However, since the actual path that the light travels is only from the holographic plate to an observer, it can be as short as a few inches, and the holographic reference grid can be reproduced free of distortion.

In this regard, two useful characteristics of holograms are that the true spatial location of the reconstructed image can be disposed arbitrarily by the positioning the associated light source and the holographic plate, and the holographic image can be magnified as necessary to the same scale as the object to be surveyed. The scaling and location of the image is achieved by altering the wavelength of the light and/or the radius of curvature (divergence) of the incident wave from the reconstruction light source to differ from that used when the hologram is recorded. This is discussed in the above-mentioned dissertation, especially at pages 39–43.

A holographic scale of the desired size and location, yet free of the problems caused by air turbulence, can thus be reconstructed and disposed at a distance at which atmospheric turbulence would otherwise have caused insuperable difficulties.

Figure 3:
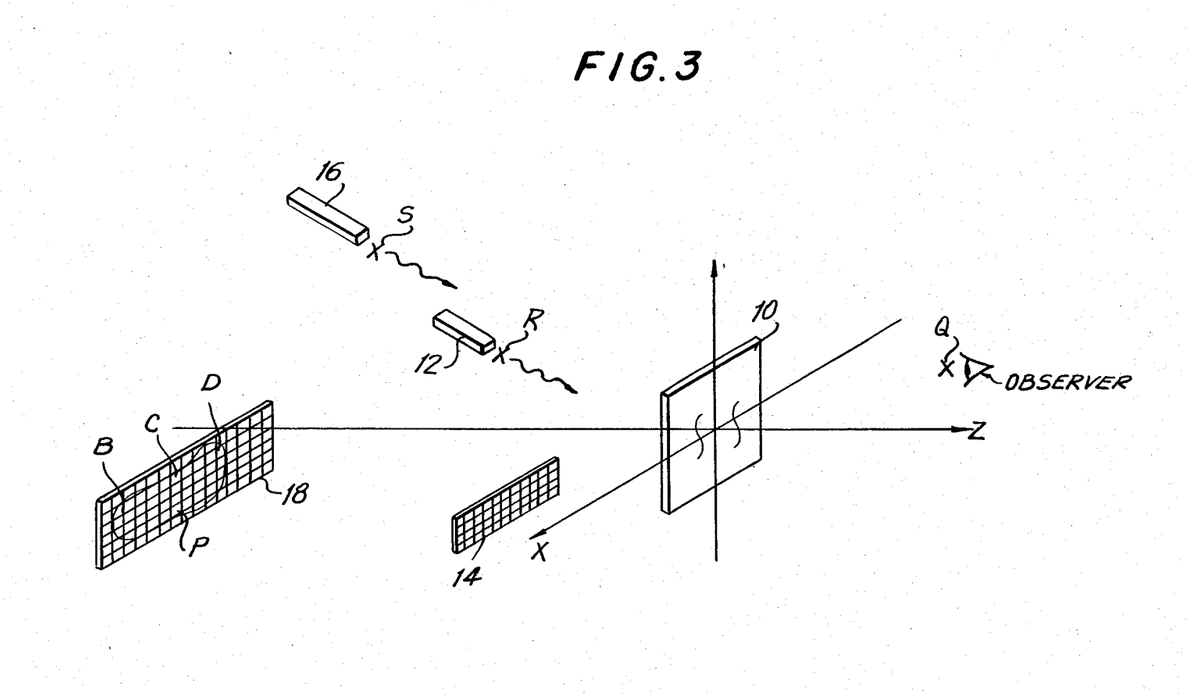
FIG. 3 illustrates the reconstruction of a holographic reference grid.

As shown in FIG. 3, a holographic plate 10 is recorded with a hologram of a reticular lattice 14 which is to serve as a reference grid. This lattice 14 can be reproduced by placing a laser or other light source 12 at a point R corresponding to the location of a reference light source used for recording the holographic plate 10. By instead using a reconstruction light source 16 at a different position S, the hologram will produce a displaced reticular lattice 18. This latter lattice 18 can be placed directly atop an object P to be observed through the holographic plate 10 by adjusting the position S of the reconstruction light source 16. As mentioned previously, the magnification, or scale of the displaced lattice 18 is also altered by changing the wavelength of the light emanating from the reconstruction light source 16, and/or by changing the distance of the reconstruction light source 16 from the holographic plate 10.

A recording of the observed positions of points on the object P relative to the lattice 18 can be made photographically, or, alternatively, can be recorded by a use of a television camera focused through the holographic plate 10, using an optical digitizer and a computer for storing data generated by the optical digitizer.

Thus, this arrangement can insert an undistorted scale into a recording of the turbulence-distorted locations of the observed points B, C, and D.

In order to determine the true locations or coordinates of the observed points B, C, and D, one or more of the observed points must have a location that is absolute and can be used as a reference point. In that way, even if the atmospheric turbulence encountered causes a fixed displacement in the positional recordings of all of the observed points A, B, and C, since the relative positions of these points can be accurately determined by statistical methods, then the absolute positions of these points can also be determined if the absolute location of one of these points is established.

Figure 4:
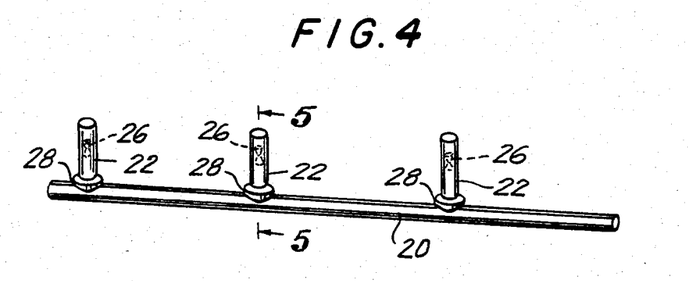
FIG. 4 illustrates a series of float tubes for use in this invention, which are connected by a water-filled pipe.
Figure 5:
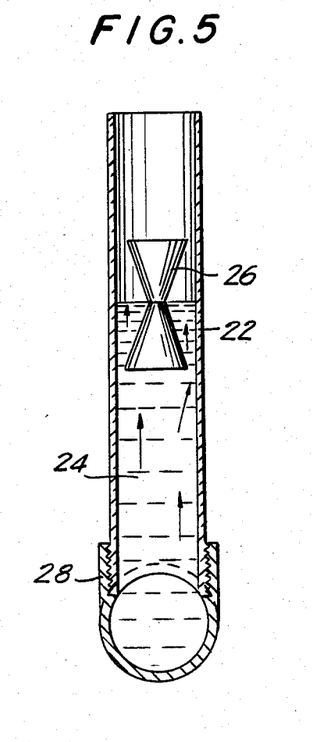
FIG. 5 is a cross sectional view of one of the float tubes of FIG. 5, taken along the line 5—5.

In this embodiment, in order to provide a true reference for use throughout a runway survey, a water pipe 20 is installed, as shown in FIGS. 4 and 5. At predetermined intervals, the pipe 20 has installed thereon vertical transparent cylinders 22 with sufficient water 24 in the pipe 20 to fill each of the cylinders 22 at least partially. An externally visible float 26 is disposed within each of the transparent cylinders 22. Preferably, each such float 26 is made highly reflective, for example, by a coating of reflective glass beads. The pipe 20 has threaded tees 28, which, as shown in FIG. 5, permit screw connection of the cylinder 22. All of the floats 26 will repose at the same level above or below sea level to provide an absolute true vertical reference.

Figure 7:
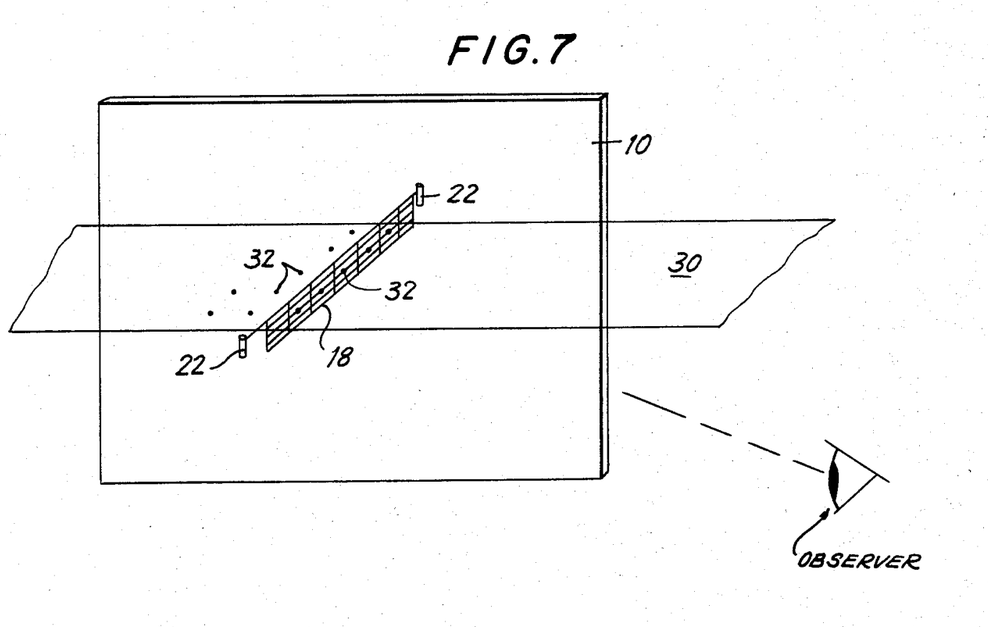
FIG. 7 shows a portion of the runway of FIG. 7 with a reconstructed holographic reference grid superimposed upon a portion thereof.

As shown in FIG. 7, a runway 30 to be surveyed has the pipe 20 extending around the entire perimeter thereof, with the vertical cylinders 22 installed at twenty foot intervals. A proper quantity of water 24 is kept in the pipe 20 so that the floats 26 will all be afloat in their respective cylinders 22 and will all be visible. It should be apparent that a straight line between any two of the floats can be used as representative of a true level surface.

Figure 6:
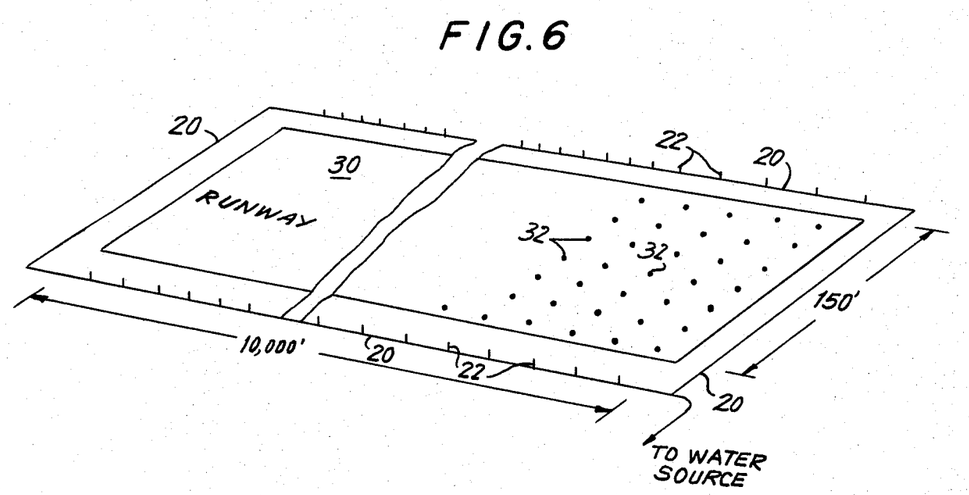
FIG. 6 is a perspective view of an airport runway prepared for the surveying technique of this invention.

As is further shown on FIG. 6, a survey grid of visible markers 32 is permanantly installed on the runway, with rows and columns thereof each being separated from adjacent rows and columns by a distance of twenty feet, which corresponds to the distance between successive vertical float cylinders 22. These visible grid markers 32 can be installed when the runway is first built, or can be installed later. In either case, these markers 32 can for example be painted or can be reflective metal discs.

Once the pipe 20, float cylinders 22, and markers 32 are installed, the holographic plate 10 and the reconstruction light source 16 can be used to place the reference lattice 18 in the same plane as a particular row of the grid markers 32, as shown in FIG. 7. A particular pair of the visible floats 26 will perforce also be disposed in the same plane as the lattice 18.

A standard photographic arrangement or a computer and optical digitizing equipment can be used with telescopic lenses to carry out the survey.

Figure 8:
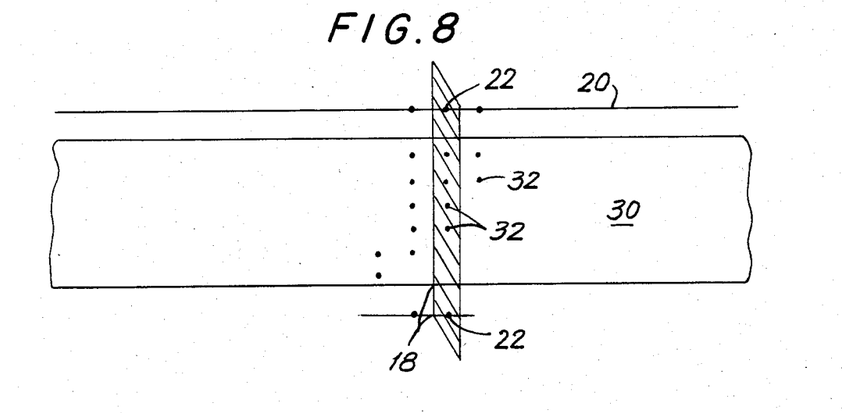
FIG. 8 is a plan view of the runway and associated holographic image reconstruction equipment for use in carrying out the surveying technique of this invention.

The survey can be performed, for example, in a vehicle at a safe distance from the side of the runway 30, so as to maintain the FAA-regulated safe distance from an active runway, such as is shown in FIG. 8.

The position and orientation of the holographic plate 10 and the reconstruction light source 16 can be adjusted until the image of the reference lattice 18 is located in the vertical plane of two selected float cylinders 22, as shown in FIGS. 7 and 8. This provides an optical section through the surface of the runway 30, and inserts the vertical scale of the lattice 18 into the plane of this cross-section to within the accuracies of direct reckoning.

The variations in elevation of the grid markers 32 in this plane, relative to the level of the floats 26, can then be observed. Using a telescopic lens to maximize the accuracy of the obtained data, and observing each row of markers 32 at an angle to narrow the width of the viewed field between the floats 26, multiple observations of the locations of the markers 32 and the floats 26 can be recorded on a data recording medium. After a significant number of observations have been taken so as to permit the determination of the statistical mean location of each of the grid markers 32 and of the floats 26, the process is repeated for other rows of the grid markers 32 until data for all such rows are recorded.

If the data are recorded photographically, the mean coordinates of each point can be visually measured and computed. Mean coordinate values can be proportionally adjusted until the value for the locations of the floats 26 is at zero on the vertical scale. After adjustment, new mean coordinate values for all the grid markers 32 will be directly comparable with one another, and the survey is, for all intents and purposes, complete. If a computer is used to record these data, software can be provided to perform all of these steps in a real time mode and provide real time results at the survey site.

In the case of photographic recording of the data, the photographic record can have superimposed thereupon a grid arrangement to permit the determination of a weighted-average location of each of the grid markers 32. For example, a dot matrix with a superimposed grid can be produced by an offset screen process to transform the greys of the original photographic negative into an array of weighted black dots. By using a magnifying lens, the dots in each grid element of the superimposed matrix can be counted, and each matrix element can be assigned a value from 0 to 10, depending upon the density of black dots.

Figure 9A:
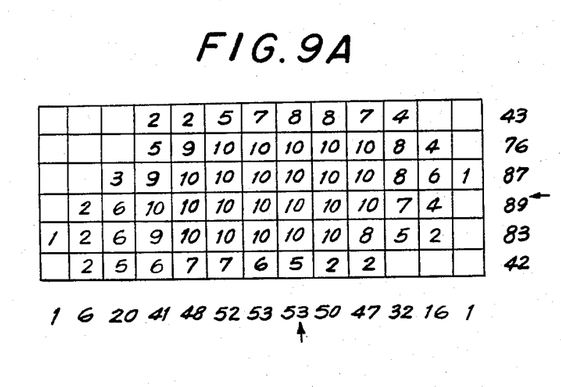
FIGS. 9A and 9B are grids illustrating the calculation of the statistical mean locations of two points to be measured.
Figure 9B:
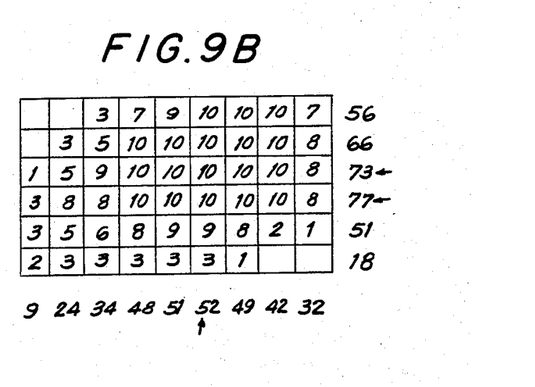

FIGS. 9A and 9B demonstrate the calculation of a typical pair of points A and B, representing the locations of two grid markers 32. The assigned values in the tables can be summed for each row and column, and the centers of mass can be identified horizontally and vertically. These two centers are identified as coordinates of the center of gravity for each point, and can be used to center that point according to the reference lattice 18 and the positions of the floats 26.

It is apparent that the center of gravity is actually the density center of the exposed area of the film for each point, and represents the center of the location that was occupied for the longest time by the point image on the negative during the multiple exposures of the photographic medium.

If optical digitizing equipment such as that shown in FIG. 8 is used, real-time survey results can be developed. In this case, a video camera 40, preferably having a telescopic lens, is focused through the holographic plate 10 onto a particular row of the grid markers 32. A video digitizer 42 connected to this camera 40 provides to a computer 44 digital data relating to the observed locations of the grid markers 32, the associated floats 26, and the lattice 18. The computer 44 an be provided with a programming algorithm to control the strobing of the video camera 40, and to continuously compute the mean location of each of the markers 32 and the floats 26. Thus, with this arrangement it is possible for the computer 44 to determine automatically when a sufficient number of observations have been taken for each particular row of these grid markers 32 to constitute a statistically significant sample. The number of observations required will depend in large part upon the turbulence conditions during the time of the survey.

Of course, this invention is not limited to the above-described embodiment, and it should be understood that the holographic grid could be three dimensional, rather than two dimensional. Furthermore, this technique could be applied to any condition wherein turbulence is a problem, such as in underwater surveying.

Also, in a two-dimensional application, it is possible to use a non-holographic virtual image of a reference grid, however the use of such a virtual image imposes very stringent conditions on the conduct of said use. For example, the distance between the transit location and the object would have to be preset and constant, with an optical imaging system designed specifically for that distance. Also, the virtual image would have to be carefully aligned to be exactly parallel with the plane of the object to be surveyed.

While one particular embodiment of this invention has been described hereinabove with reference to the drawings, it should be apparent that many modifications and variations thereof exist and can be carried out by those of ordinary skill in the art without departing from the scope and spirit of this invention as defined in the appended claims.

What is claimed is:

1. A method of surveying a structure of large dimension in which optical errors caused by environmental turbulence are statistically corrected comprising:
   placing visible grid markers at predetermined locations on said structure;
   reconstructing a holographic reference grid and superimposing the reconstructed reference grid on selected ones of said grid markers;
   recording the locations of images of said selected grid markers and of the reconstructed grid a plurality of times; and
   determining statistical means of the locations of the images of each said selected grid marker relative to the reconstructed grid from said plurality of said recordings thereof.

2. A method of surveying a structure of large dimension in which random optical errors caused by turbulence of an optical medium are statistically corrected comprising:
   arraying visible grid markers at predetermined spaced locations on said structure to form groups such that grid markers of groups of said grid markers are aligned;
   establishing a pair of absolute reference points arranged in a plane with the aligned grid markers of each of one or more particular groups;
   optically reconstructing a holographic reference grid and superimposing the same on said group or groups of grid markers in said plane or planes with said absolute reference points;
   recording the locations of images of said group or groups of grid markers, said absolute reference points, and the reconstructed grid a plurality of times; and
   determining statistical means of the locations of the images of each said grid marker and each said absolute reference point relative to said reconstructed grid and relative to each other from said plurality of recordings thereof.

3. A method of surveying a structure of large dimension in which random optical errors caused by atmospheric turbulence are statistically corrected comprising:
   arraying visible grid markers at predetermined spaced locations on said structure to form groups such that grid markers of groups of said grid markers are aligned;
   establishing a pair of absolute reference points arranged in a plane with the aligned grid markers of each of one or more particular groups by disposing a pair of vertical tubes at opposite ends of at least one of said groups of grid markers, with each said tube containing a liquid and a float in said liquid visible from an observation point, and interconnecting said vertical tubes so that said floats are at the same level relative to sea level;
   optically reconstructing a holographic reference grid and superimposing the same on said group or groups of grid markers in said plane or planes with said absolute reference points;
   recording the locations of images of said group or groups of grid markers, said absolute reference points, and the reconstructed grid a plurality of times; and
   determining statistical means of the location of the images of each said grid marker and each said absolute reference point relative to said reconstructed grid and relative to each other from said plurality of recordings thereof.

4. A method of surveying a structure of large dimension in which random optical errors caused by turbulence of an optical medium are statistically corrected comprising:
   arraying visible grid markers at predetermined spaced locations on said structure to form groups such that grid markers of groups of said grid markers are aligned;
   establishing a pair of absolute reference points arranged in a plane with the aligned grid markers of each of one or more particular groups;
   optically reconstructing a holographic reference grid and superimposing the same on said group or groups of grid markers in the associated plane or planes with absolute reference points, including observing said group or groups of grid markers through a holographic plate containing a hologram of said reference grid, illuminating said holographic plate with a reconstruction light source, and adjusting the position of said reconstruction light source relative to said holographic plate so that the holographic reference grid is magnified and disposed in the plane or planes containing said group or groups of said grid markers and the associated absolute reference points;
   recording the locations of images of said group or groups of grid markers, said absolute reference points, and the reconstructed grid a plurality of times; and
   determining statistical means of the location of the images of each said grid marker and each said absolute reference point relative to said reconstructed grid and relative to each other from said plurality of recordings thereof.

5. The method of surveying according to claim 4; wherein the step of adjusting the position of said reconstruction light source relative to said holographic plate includes scaling the reconstructed image of the holographic reference grid to a size appropriate for the structure being surveyed.

6. A method of surveying a structure of large dimension in which random optical errors caused by turbulence in an optical medium are statistically corrected comprising:
   arraying visible grid markers at predetermined spaced locations on said structure to form groups such that grid markers of groups of said grid markers are aligned;
   establishing a pair of absolute reference points arranged in a plane with the aligned grid markers of each of one or more particular groups;
   optically reconstructing a holographic reference grid and superimposing the same on said group or groups of grid markers in said plane or planes with said absolute reference points;
   recording the locations of images of said group or groups of grid markers, said absolute reference points, and the reconstructed grid a plurality of times by photographically multiple-exposing image-retaining means to the images of said grid markers, said absolute reference points, and said reconstructed reference grid; and determining statistical means of the locations of the images of each said grid marker and each said absolute reference point relative to said reconstructed grid and relative to each other from said plurality of recordings thereof.

7. The method of surveying according to claim 6; wherein the step of determining statistical means of the locations of images includes weighting the multiple-exposed images recorded on said image retaining means based on density of the multiple-exposed images; and determining a weighted-average center of all such images of each of said grid markers and of said absolute reference points.

8. A method of surveying a structure of large dimension in which random optical errors caused by turbulence of an optical medium are statistically corrected comprising:

arraying visible grid markers at predetermined spaced locations on said structure to form groups such that grid markers of groups of said grid markers are aligned;

establishing a pair of absolute reference points arranged in a plane with the aligned grid markers of each of one or more particular groups;

optically reconstructing a holographic reference grid at a location remote from the structure being surveyed and superimposing the reconstructed holographic reference grid on said group or groups of grid markers in said plane or planes with said absolute reference points;

recording the locations of images of said group or groups of grid markers, said absolute reference points, and the reconstructed grid a plurality of times; and determining statistical means of the location of the images of each said grid marker and each said absolute reference point relative to said reconstructed grid and relative to each other from said plurality of recordings thereof.

9. A method of surveying a structure of large dimension in which random optical errors caused by turbulence of an optical medium are statistically corrected comprising:

arraying visible grid markers at predetermined spaced locations on said structure to form groups such that grid markers of groups of said grid markers are aligned;

establishing a pair of absolute reference points arranged in a plane with the aligned grid markers of each of one or more particular groups;

optically reconstructing a holographic reference grid and superimposing the same on said group or groups of grid markers in said plane or planes with said absolute reference points;

recording the locations of images of said group or groups of grid markers, said absolute reference points, and the reconstructed grid a plurality of times, including real-time recording of said locations employing optical digitizing means and a computer to obtain said plurality of recordings; and simultaneously with said recording, determining statistical means of the locations of the images of each said grid marker and each said absolute reference point relative to said reconstructed grid and relative to each other, including computing said statistical means on said computer from the real-time recordings of said locations.

10. A method of surveying an airport runway for flatness in which optical errors caused by environmental turbulence are statistically corrected comprising:

placing visible grid markers at predetermined locations on said runway so that rows of said markers extend across the runway;

establishing a pair of absolute vertical reference points for each said row of grid markers by disposing vertical transparent tubes on both sides of said runway and aligned with each said row of grid markers, with a trough pipe connecting the transparent tubes on both sides of the runway, the tubes and trough pipe containing sufficient liquid so that the tubes are all at least partially filled, and with a visible marker float disposed in each said tube to be visible from an observation point;

at a point laterally disposed from the runway, optically reconstructing a holographic reference grid and superimposing the same on at least one said row of said grid markers and its associated vertical tubes;

recording the location of images of said at least one row of grid markers, of the associated marker floats, and of the reconstructed reference grid a plurality of times;

determining statistical means of the location of the images of said grid markers and said marker floats relative to each other and relative to said reconstructed grid from plurality of recordings thereof.

11. The improved method of surveying an airport runway according to claim 10, further comprising repeating the steps of optically reconstructing the holographic reference grid, recording said locations, and determining the statistical means for successive rows of said grid markers and the associated marker floats.

* * * * *